W. Meigs.
Harvester Rake.
Nº 35945 — Patented Jul. 22, 1862
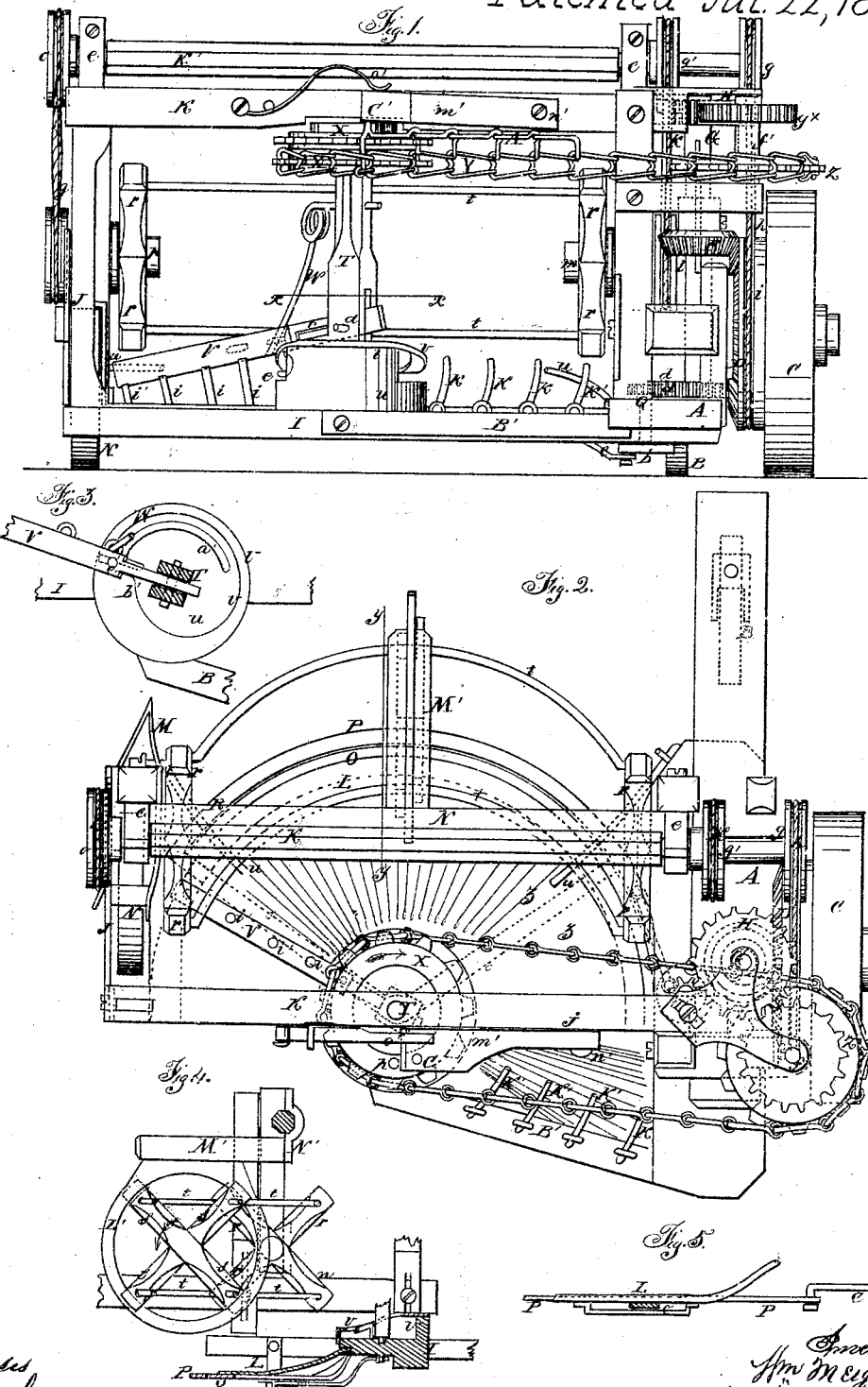

UNITED STATES PATENT OFFICE.

WILLIAM MEIGS, OF WAYNESVILLE, OHIO.

IMPROVEMENT IN HARVESTERS.

Specification forming part of Letters Patent No. 35,945, dated July 22, 1862.

*To all whom it may concern:*

Be it known that I, WILLIAM MEIGS, of Waynesville, in the county of Warren and State of Ohio, have invented a new and Improved Harvester; and I do hereby declare that the following is a full, clear, and exact description of the same, reference being had to the accompanying drawings, making a part of this specification, in which—

Figure 1 is a back view of my invention. Fig. 2 is a plan or top view of the same. Fig. 3 is a section of a portion of the same, taken in the line $x\ x$, Fig. 1. Fig. 4 is a section of a portion of the same, taken in the line $y\ y$, Fig. 2. Fig. 5 is a section of a portion of the same, taken in the line $z\ z$, Fig. 2.

Similar letters of reference indicate corresponding parts in the several figures.

This invention consists, first, in the employment or use of a semicircular cutter, in connection with a curved reel arranged as hereinafter fully shown and described, whereby the grain may be cut and laid on the platform in an even manner, favorable for the operation of a revolving rake which rakes it therefrom.

The invention consists, second, in a novel raking device for raking the cut grain from the platform, whereby the cut grain may be deposited in gavels on the ground at the rear of the machine, ready for binding.

To enable those skilled in the art to fully understand and construct my invention, I will proceed to describe it.

A represents what may be termed the "main frame" of the machine, supported at its front end by a caster-wheel, B, and at its back part by a wheel, C, having a toothed rim, D, secured concentrically to its inner side, into which a pinion, E, gears, the latter being on a vertical shaft, G, having a toothed wheel, H, on its upper end.

I is a bar which is attached at right angles to the main frame A, and has an upright framing, J, secured to its outer end, the upper part of which is connected to a frame, A, by a crossbar, K.

L is a semicircular platform, the back part of which is attached to the bar I, and M is a shoe or divider attached to the lower part of the framing J. The framing J has a wheel, N, fitted in it for supporting the grain or lefthand side of the machine, the axles of the two wheels C N being in line with each other. The front part of the platform L is attached to a curved bar, O, to which fingers of the usual construction may be attached, and P is a curved sickle-bar, the teeth of which may be of the same form as those of the ordinary reciprocating sickles. The sickle-bar P is connected to two radial arms, $a\ a$, which are pivoted to the bar I at a point which is at the center of a circle of which the sickle-bar P is a part, the front end of the platform being concentric with it. The ends of the sickle-bar P work on guides on bar O. The sickle-bar has a reciprocating motion given it by means of a crank-wheel, $b$, and pitman $c$, the crank-wheel being at the lower end of a shaft, Q, in the main frame A, which receives its motion by gearing $d\ d$ from the lower end of the shaft G. (See Fig. 1.)

R is a frame composed of two uprights, $e\ e$, which are secured in the main frame A and framing J by set-screws, which pass through oblong slots to admit of the uprights being raised or lowered, as desired. In the upper parts of the uprights $e\ e$ there is fitted a shaft, K', having upon it, at one end, two pulleys, $g\ g'$, one of which has a belt, $h$, passing around it, said belt also passing around a pulley, $i$, attached to wheel C. The pulley $g'$ has a belt, $k$, passing around it, which also passes around a pulley, $l$, in a shaft, $m$, in one of the uprights $e$. By means of these belts motion is communicated to the shaft $m$ from the wheel C. On the opposite end of shaft K' there is placed a pulley, $o$, from which a shaft, $p'$, in the other upright $e$, is driven by a belt, $q$. The two shafts $m\ p$ have each four arms, $r$, at their inner ends, and four similar arms, $s$, are placed in a ring, L', which is suspended from a bar, M', attached at right angles to a bar, N', the ends of which are secured in the uprights $e\ e$ and form a part of the frame R. The ring L' and its arms $s$ are not in line with the arms $r$ of the shafts $m\ p$, the arms $s$ being somewhat farther forward than the arms $r$, so as to give rods $t$, which are secured in said arms, near their outer ends, a curved form corresponding to the curvature of the front part of the platform. The rods $t$ are fitted loosely in the arms $r\ s$, and the arms $s$ are allowed to turn freely in the ring L'. By this arrangement, therefore, it will be seen that the rods $t$, as the arms $r\ s$ rotate, will sweep over the front edge of the platform, at an equal distance from it all around its edge, and throw the cut grain evenly upon the platform.

To the main frame A and upright framing J there are attached guides $u$ $u$, one to each, which insure the grain being laid, heads backward, on the platform and toward its center, as indicated in red in Fig. 2.

The portion of the main frame A which has the bar I attached to it may be so arranged as to be capable of being raised and lowered to regulate the height of the cut of the sickle. The wheel N of the framing may also be so arranged as to admit of the framing J being raised and lowered to conform to the height of the adjustable part of the main frame A.

T is a vertical shaft, the lower end of which is stepped in the bar I, the upper bearing of said shaft being in the cross-bar K. On the lower part of said shaft there is placed a cam, U, which is formed of a curved annular plate, $v$, bent out of a horizontal plane and secured to the upper surface of a wheel, $w$.

To the upper surface of the wheel $w$, and within the annular plate $v$, there is secured a curved rod, $a'$, (see Fig. 3,) and the plate $v$, at its inner side, is formed with a lateral projection, $b'$.

In the shaft T a rake-arm, V, is fitted, and allowed to slide longitudinally a certain distance therein, in consequence of having a slot, $c'$, made longitudinally in it, through which a pin, $d'$, passes, said pin also passing through the shaft T. A spring, W, which is attached to the shaft T, has a tendency to keep the rake-arm V shoved outward from shaft T the full length of the slot $c'$, and so that a stop, $e'$, at the under side of the rake-arm will bear against the inner side of the annular plate $v$.

On the upper end of the shaft T there are placed two toothed wheels, X X'. The uppermost wheel, X, is attached permanently to shaft T, while the under one, X', is placed loosely on it.

Y is a chain which passes around the wheel X' and around a toothed wheel, Z, on a shaft, $f'$, in the main frame. The upper end of the shaft $f'$ has a toothed wheel, $g^\times$, on it, into which the toothed wheel H on the shaft G gears. By this means a continuous rotary motion is given the pulley X' from the wheel C. The shaft T, however, is rotated intermittingly, as follows: The chain Y has a supplemental chain, A', attached, which is in line with the pulley X. The chain A' is of such a length as to rotate the pulley X just one revolution, and the shaft T of course has the same movement, and also the rake-arm U, the teeth $i'$ of which rake the cut grain from off the platform L at a point designated by $j'$.

B' is a stationary rake just back of the platform L, at its discharging side, the teeth $k'$ of which are so arranged as to admit of the teeth $i'$ of the arm V passing between them. The stationary rake B' serves as a stop for the cut grain, and causes it to be discharged in gavels from the platform L. The pulley X and shaft T are prevented from casually rotating by means of a spring-stop, C', which is formed of a pin, $l'$, attached to a bar, $m'$, secured by a pivot, $n'$, to the cross-bar K, the bar $m'$ having a spring, $o'$, bearing on its upper surface. The pin $l'$ is kept in a hole, $p'$, in the pulley X by means of the spring $o'$, and said pin is raised out of the hole $p'$ by the first link of the supplemental chain A as it engages with the pulley X. During the cessation of the movement of the shaft T and rake-arm V time is allowed for a requisite amount of grain to be deposited on the platform L, and during the commencement of the movement of the rake-arm V it is drawn a little backward by the lateral projection $b'$, so that the end of the rake-arm may clear the back part of the framing J, and when past it the spring W throws the rake-arm forward to its original position.

Having thus described my invention, what I claim as new, and desire to secure by Letters Patent, is—

1. The reel formed of curved rods or beaters $t$, fitted in arms $r$ $r$ $s$, arranged as shown, in combination with the curved or semicircular sickle-bar P and platform L, as and for the purpose specified.

2. The cam U, constructed as shown, in connection with the spring W and longitudinal slot $c'$ in the rake-arm V, for the purpose of operating the latter, as set forth.

3. The stationary rake B', arranged as shown, in combination with the intermittingly-rotating rake-arm V, for the purpose specified.

WILLIAM MEIGS.

Witnesses:
 ABSALOM E. MERRITT,
 J. B. COLLETT.